Oct. 4, 1932.  H. C. A. POTEZ  1,881,296
METAL BUILT AIRCRAFT
Filed Jan. 6, 1931   5 Sheets-Sheet 1

Oct. 4, 1932.  H. C. A. POTEZ  1,881,296
METAL BUILT AIRCRAFT
Filed Jan. 6, 1931  5 Sheets-Sheet 2
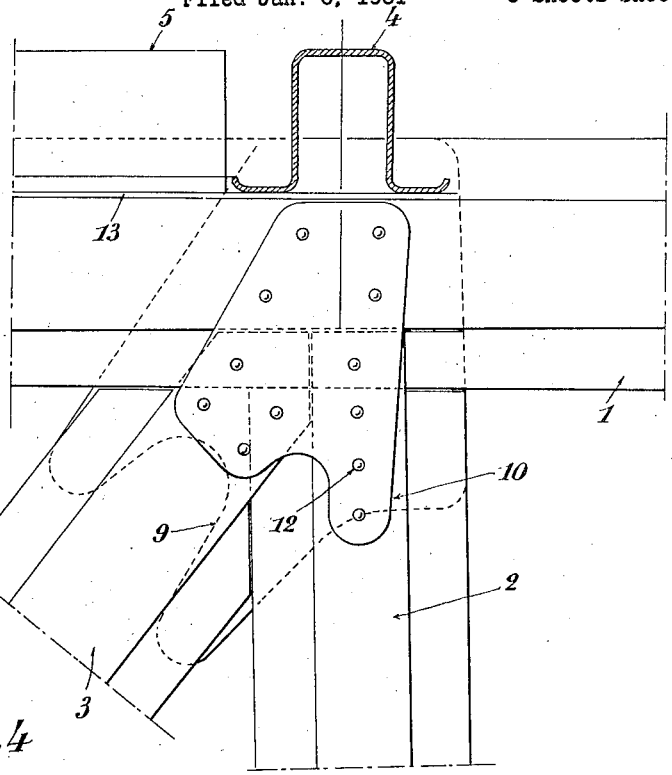
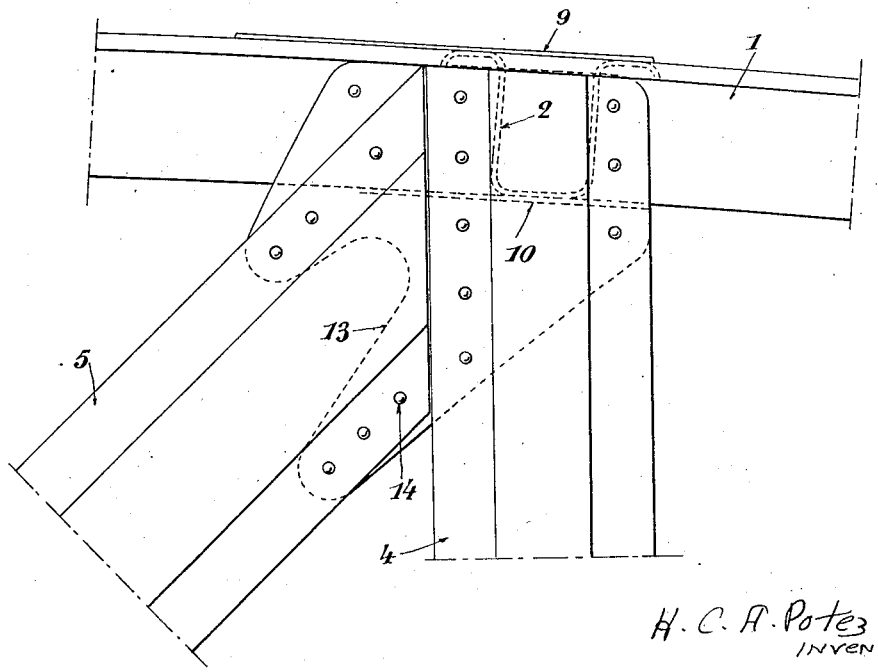

Oct. 4, 1932.  H. C. A. POTEZ  1,881,296
METAL BUILT AIRCRAFT
Filed Jan. 6, 1931  5 Sheets-Sheet 3
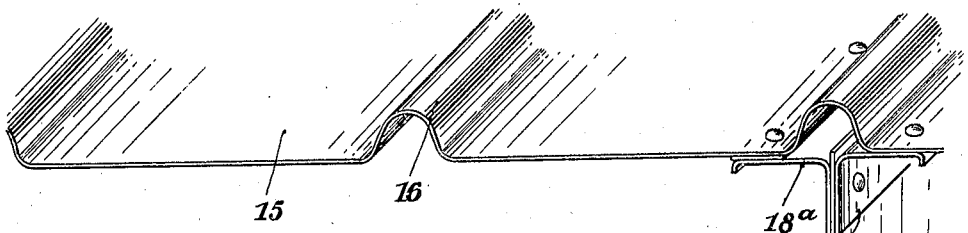
Fig.6
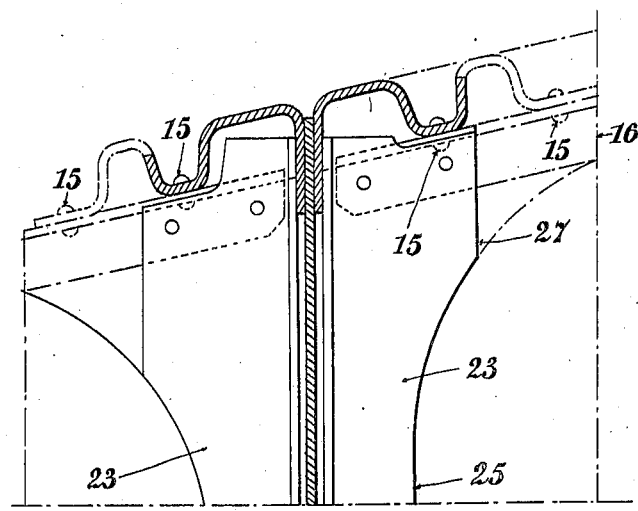
Fig.9
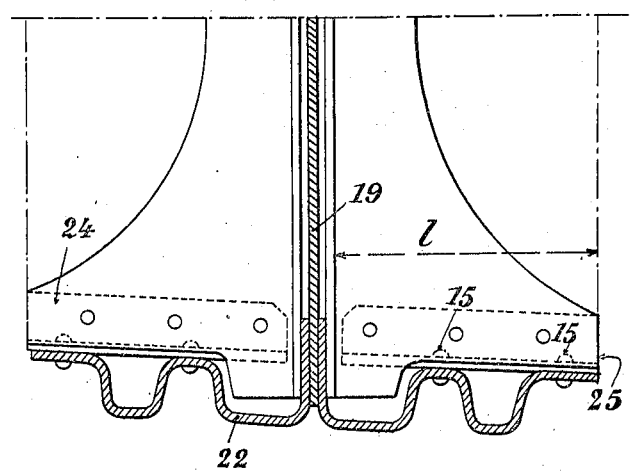

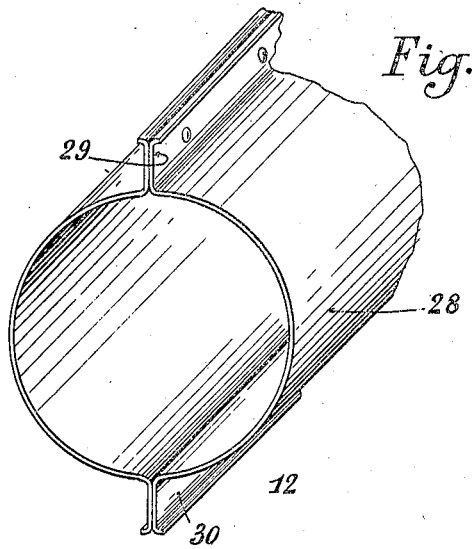
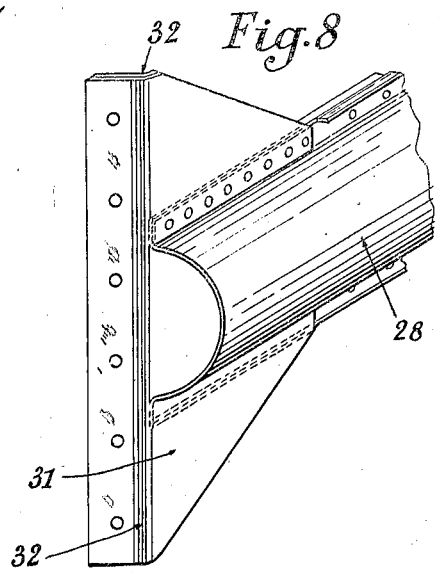
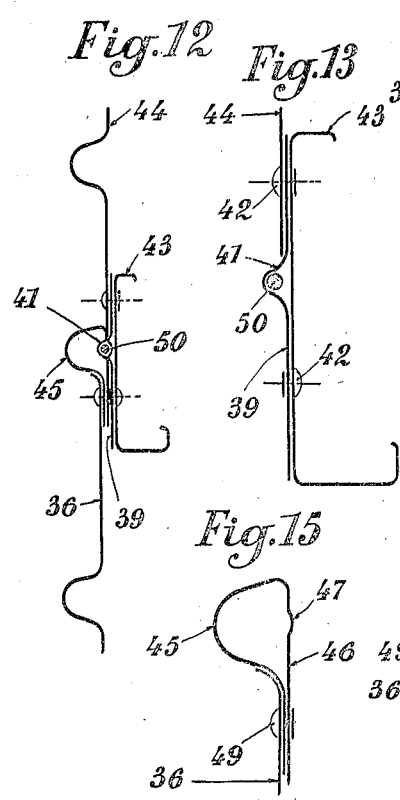
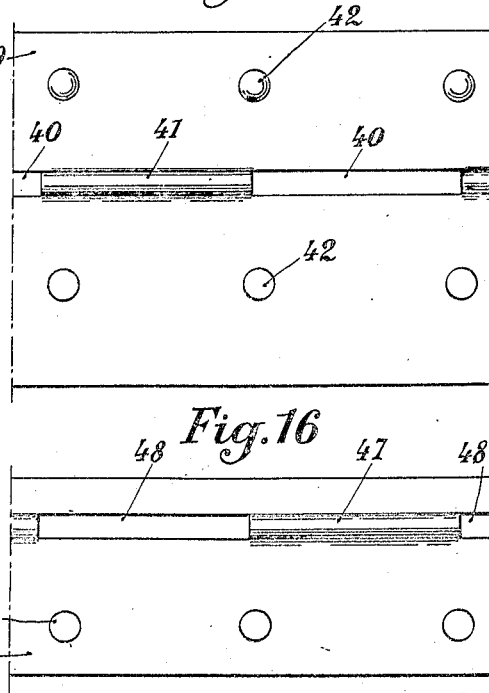

Oct. 4, 1932.  H. C. A. POTEZ  1,881,296
METAL BUILT AIRCRAFT
Filed Jan. 6, 1931   5 Sheets-Sheet 5

Patented Oct. 4, 1932

1,881,296

UNITED STATES PATENT OFFICE

HENRY CHARLES ALEXANDRE POTEZ, OF MEAULTE, SOMME, FRANCE

METAL BUILT AIRCRAFT

Application filed January 6, 1931, Serial No. 506,952, and in France January 27, 1930.

My invention relates to metal-built airplanes, seaplanes or other aircrafts. It essentially comprises several arrangements and combinations or special embodiments of organs that are intended to facilitate the construction and diminish weight without impairing resistance.

Concerning, for instance, the fuselage, the longitudinal girders, vertical and oblique members and horizontal bars, which consist of hollow open sectional irons substantially U-shaped in cross-section and provided with flanges, are disposed in such manner that their open side is outwardly disposed and that their flanges lie in the same vertical plane. The connection of these three elements together is ensured by means of a gusset secured to the flanges and eventually of another gusset secured to the webs of the U bars. On the other hand the metal sheets that form the covering of the fuselage are directly secured to the flanges of these above mentioned elements namely the longitudinal girder and the oblique and vertical members. Furthermore, the connection between the horizontal bars and the longitudinal girders is obtained in a similar manner to that above mentioned concerning the vertical or oblique members.

Another improvement according to my invention consists in the provision of movable panels hinged to the intrados or under surface of the wing so as to permit easy access to the inside thereof.

Other characteristics of my invention will result from the following description.

Preferred embodiments of my invention will be hereinafter described with reference to the appended drawings, given merely by way of example, in which:

Fig. 3 is an elevational view seen from the direction of arrow $f^1$ of Fig. 1, showing the joint of the fuselage bars with the longitudinal girder;

Fig. 4 is a similar plan view seen from the direction of arrow $f^2$ of Fig. 1;

Fig. 6 is a perspective view of a metallic covering according to my invention;

Fig. 7 is a perspective view of a brace for strengthening the wing;

Fig. 8 is a perspective view of one end of this brace provided with its fixation gusset;

Fig. 9 is a sectional view of the longitudinal member of a wing provided with its strengthening brace;

Figure 10:
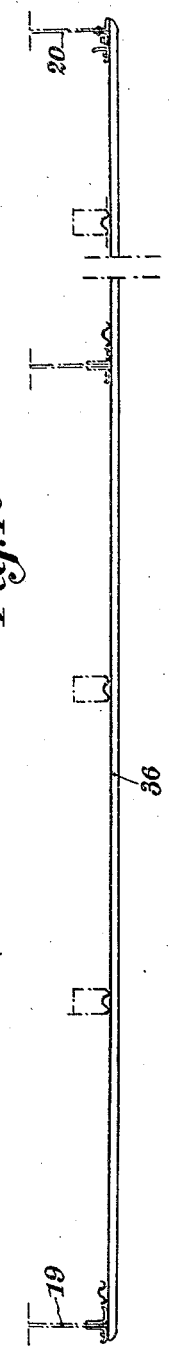
Figure 11:
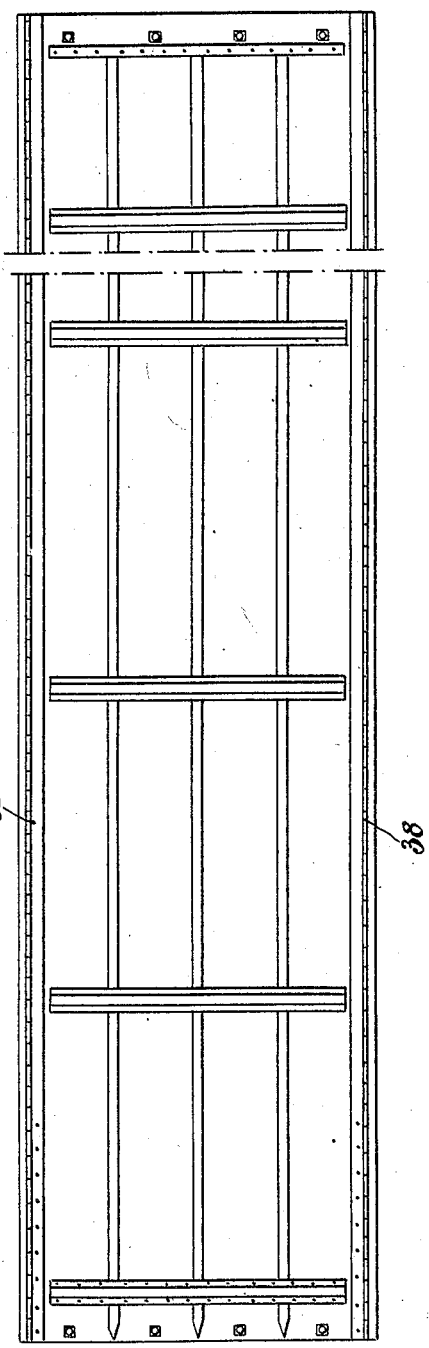

Figs. 10 and 11 are a vertical section and a plan view respectively of a removable panel permitting access into the inside of the wing; and Figs. 12 to 16 show some details of the hinges serving to the fixation of the removable panel; Figs. 12, 13 and 15 are sectional views and Figs. 14 and 16 are plan views corresponding to Figs. 13 and 15 respectively.

Figure 1:
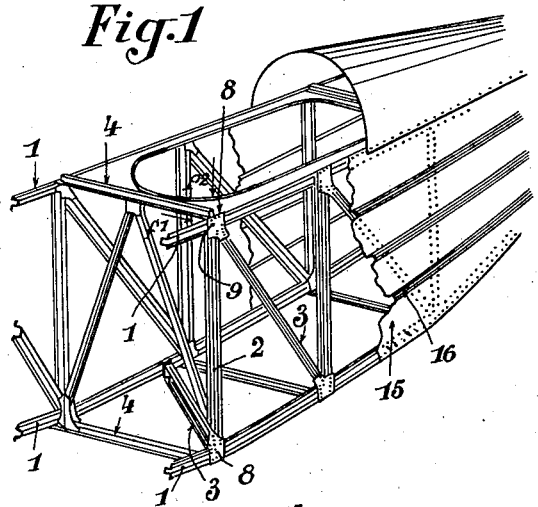
Fig. 1 is a perspective view of the fuselage of an aircraft comprising the improvements according to my invention, a part of the covering being cut away to show the frame.

In the embodiment shown in Fig. 1, the fuselage consists of a girder comprising four longitudinals 1 connected by vertical struts 2 and diagonal tie bars 3 on the sides, and horizontal transverse bars 4 and diagonal tie members 5 (Figs. 3 and 4).

Figure 5:
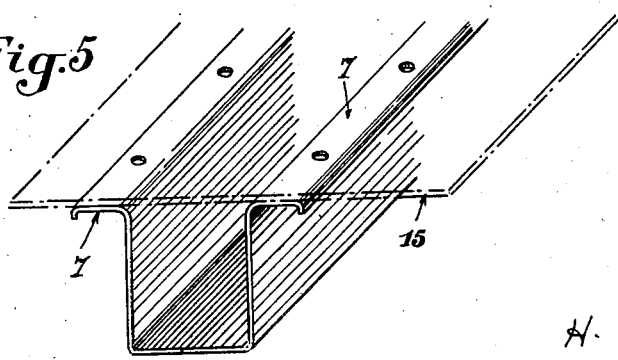
Fig. 5 is a perspective view of a sectional iron such as used according to my invention.

All these bars, including longitudinals 1 consist of sectional irons having an open cross section, which may for instance be U-shaped, as shown in 6, Fig. 5, and provided with lateral flanges 7, or have any other similar shape. The open part of the U section is outwardly disposed with respect to the framing.

The connecting bars are secured to the longitudinals through joint arrangements such as 8 (Fig. 1).

In Figs. 3 and 4 this arrangement 8 has been shown as seen from the directions of arrows $f^1$ and $f^2$ (Fig. 1) respectively. The horizontal and vertical bars are so arranged as not to be fixed to the same point of longitudinal 1. Accordingly cross members 4 are located above the axis of the longitudinal, and their flanges 7 bear upon the outer face of the upper lateral side of the U of the longitudinal. As for members 2 and 3, they exactly fit in the width of longitudinal 1. This arrangement permits of using distinct gussets that are as simple as possible for securing the vertical and the horizontal bars respectively.

The fixation of members 3 and 2 to longitudinal 1 is effected by means of two gussets 10 and 9 respectively. The outer gusset 9 (Figs. 1 and 3) is applied against the flanges of the different sectional irons (the fixation points can be seen in Fig. 1). The inner gusset 10, on the contrary, is applied against the central part of the irons, that is against the back of the U (the points of fixation can be seen in 12 in Fig. 3).

The fixation of the horizontal bars 4 and 5 is obtained by means of a single gusset 13 (Figs. 3 and 4) interposed between the flanges of horizontal bars 4 and 5 and the lateral side of the U of longitudinal 1 (the points of fixation can be seen in Fig. 4).

It will readily be understood that the above described arrangement provides a particularly great accessibility for setting the necessary rivets, which could not be obtained with most of the sectional irons generally used and chiefly with tubes and sectional irons having a closed cross section.

Besides, the metallic covering 15 of the fuselage which is applied once the lattice structure has been completed changes the sectional irons of the framing into closed elements (Fig. 5) which are particularly apt to offer a high resistance to buckling and to twisting.

Said metallic covering preferably consists of a sheet of metal provided with spaced corrugations such as those shown in 16 in Fig. 6.

This covering is riveted on longitudinals 1 and on the vertical and diagonal members of the fuselage, so as to ensure the necessary rigidity thereof.

Figure 2:
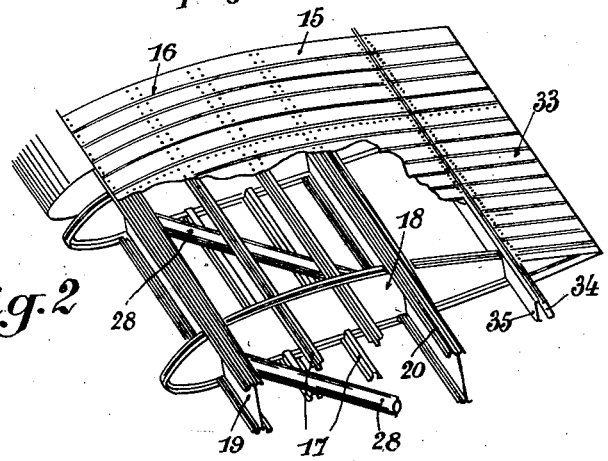
Fig. 2 is a similar view showing a section of a wing.

The mode of construction of the wing shown in Fig. 2 comprises a metallic covering similar to that of the fuselage.

The corrugations 16 of covering 15 are disposed at the outside and are parallel to the direction of travel of the aircraft.

The covering is secured to sectional irons 17 disposed in a transverse direction with respect to the path of travel of the aircraft and having an open cross section similar to that of the sectional irons of the fuselage. Said elements 17 are disposed substantially at right angles to the corrugations so that the combination of corrugations 16 and members 17 forms a rigid whole. Members 17 are in turn secured to the ribs 18 which rest on the main girders 19 and 20 of wing 11.

Said ribs 18 may consist (Figs. 2 and 6) of a web 18 carrying on its edges angle irons $18^a$ and $18^b$ upon which is fixed covering 15. Said angle irons are cut away for the passage of main girders 19 and 20. Preferably, care should be taken that a corrugation 16 of covering 15 should coincide with a rib so as to further strengthen the structure in this point.

Each of the main girders (the wing may comprise two of them, or only one) consists, for instance, of a solid web 19 and two treads made for instance of angle irons 22 having corrugated wings, as shown in Fig. 9.

Furthermore, in order to avoid local buckling in the corrugations of irons 22, gussets 23 are provided at intervals along the main girder. Said gussets support the corrugations through angle irons 24. These gussets have the further advantage to be able to fit any width of tread 22. For this purpose, the width $l$ of these strengthening members is chosen sufficiently great for being adapted to the largest treads. The vertical edge 25 of the gusset is concave so that the lower part of the gusset may for instance keep in 26 its greatest width while it is cut away in 27 at its upper end so as to be reduced to the smaller width of the upper tread.

It will appear that with such a wing structure the force exerted by air upon the covering is transmitted to the main girders of the wing through corrugations 16, members 17 and ribs 18, so that the whole forms a rigid structure. This is due to the fact that covering 15 and its corrugations 16 prevent any buckling or torsional strain of members 17. Said members 17 in turn contribute in stiffening ribs 18 while the latter maintain the main girders 19 and 20 in position and prevent them from overturning.

In spite of the fact that such a system is capable of withstanding by itself stresses exerted in the plane of the wing, and torsional stresses, an inner bracing is however provided. This bracing is constituted by diagonal elements 28. Said diagonal members preferably have the shape shown in Fig. 7. They are formed by juxtaposing two semi-cylinders provided with flanges 29 and 30. They are provided at their ends with gussets 31 (Fig. 8), suitably bent in 32, which allow on the one hand to transmit the stresses on the treads of the main girders (Fig. 2) and on the other hand to contribute with ribs 18 in preventing the overturning of the main girders.

The ailerons 33 consist of a metallic covering suitably ribbed, of the type described carried by a sectional iron 34 hinged to sectional iron 35 disposed at the rear part of the wing (Fig. 2).

According to another characteristic of the wing, accessibility to the inside of the wing provided with its covering is ensured between ribs 18 by means of the removable panel 36 (Figs. 10 and 11) mounted on two hinges 37 and 38. Panels 36 are especially provided on the intrados or under surface of the wing where, as a rule, considerable pressure is generally exerted. On the extrados or upper surface of the wing where strong depressions are exerted, the covering is entirely riveted on members 17, as it has been above explained. Likewise, the stationary panels of the under surface of the wing are riveted on members 17.

In Figs. 12 to 16 have been shown in section and in plan view details of hinges 36 and 37 of a removable panel, said hinges being disposed along the longer side of the removable element, that is to say at right angles to the main girders 19 and 20 of the wing.

Each hinge may be formed as follows: The fixed portion, which is riveted to the stationary parts of the wing covering, comprises a stationary hinge element 39 formed by a metallic sheet provided with a slight corrugation. Said sheet is hollowed out at 40 for instance the part 41 of the corrugation being untouched. The hinge element 39 is fixed by means of flat rivets 42 to the stationary element 43 which in turn is riveted to the stationary covering 44 of the wing, which ensures the necessary rigidity.

The part that is secured to the removable panel consists of a metallic sheet suitably bent so as to form a tubular section. The profile of the tube thus obtained is remarkable in that the portion 45 projecting from the under surface of wing 7 has the shape and the size of a corrugation of the covering, while the part 46 nearest to the wing is flat and provided with a small wrinkle 47 cut away in 48.

Said tube is secured to the metallic sheet 36 of the removable panel of which it is a part through rivets 49 which are flattened on the side nearest to the wing so as not to form projections that would interfere with the fitting of the removable on the stationary part of the wing.

A spindle 50, consisting for instance of a steel rod serves to maintain together the stationary part and the removable panel, after the elements have been fitted together.

In order to fit removable panel 36 on the wing, the corrugations 47 of this panel are introduced into the holes 40 of the stationary part, and the corrugations 41 of the stationary part are introduced into the holes 48 of the removable part. After proper adjustment of the parts, spindle 50 is passed through corrugations 41 and 48 thus joining together the stationary part and the removable part.

While I have disclosed what I deem to be the preferred form of my invention I do not wish to be limited thereto as there might be changes made in the construction disposition and form of the parts without departing from the spirit of my invention as comprehended within the scope of the appended claims.

Having now described my invention what I claim as new and desire to secure by Letters Patent is:

1. Aircraft fuselage frame comprising longitudinals, and vertical and diagonal side members for connecting said longitudinals together, all these elements consisting of U-shaped sectional irons having their open sides outwardly disposed with respect to the frame, lateral flanges on said irons parallel to the bottom part of the U, the flanges of adjoining irons being disposed in the same vertical plane, gussets applied against the lateral flanges of adjoining irons, and gussets applied against the bottom part of the U of adjoining irons for assembling and securing them together.

2. Aircraft fuselage frame comprising longitudinals, and vertical and diagonal side members for connecting said longitudinals together, all these elements consisting of U-shaped sectional irons having their open sides outwardly disposed with respect to the frame, lateral flanges on said irons parallel to the bottom part of the U, the flanges of adjoining irons being disposed in the same vertical plane, gussets applied against the lateral flanges of adjoining irons, gussets applied against the bottom part of the U of adjoining irons for securing them together, horizontal U-shaped irons having their open sides inwardly disposed with respect to the frame, and lateral flanges on said last mentioned irons, parallel to the bottom part of the U thereof, and riveted to the bottom part of the U of the longitudinals.

3. Aircraft fuselage frame comprising longitudinals, and vertical and diagonal side members for connecting said longitudinals together, all these elements consisting of U-shaped sectional irons having their open sides outwardly disposed with respect to the frame, lateral flanges on said irons parallel to the bottom part of the U, the flanges of adjoining irons being disposed in the same vertical plane, gussets applied against the lateral flanges of adjoining irons, gussets applied against the bottom part of the U of adjoining irons for securing them together, horizontal U-shaped irons having their open sides inwardly disposed with respect to the frame, lateral flanges on said last mentioned irons parallel to the bottom part of the U thereof and riveted to the bottom part of the U of the longitudinals, and a gusset interposed between the last mentioned flanges and the longitudinals.

4. Fuselage frame for aircraft comprising longitudinals, and vertical and diagonal side members for connecting said longitudinals together, all these elements consisting of U-shaped sectional irons having their open sides outwardly disposed with respect to the frame, lateral flanges on said irons parallel to the bottom part of the U thereof, the flanges of adjoining irons being disposed in the same vertical plane, gussets applied against the lateral flanges of adjoining irons, gussets applied against the bottom part of the U of adjoining irons for securing them together, and a metallic fuselage covering secured to the outwardly disposed lateral flanges of the first mentioned elements.

5. In an aircraft wing frame comprising two trussed parallel girders, a diagonal brace comprising two semi-cylindrical elements, flanges on said elements, means for securing said flanges to each other, and gussets at both ends of said brace for fixing it to the main girders, said gussets having a height equal to that of the web of the main girders so as to act as a strut between the flanges of said girders.

6. A strut for connecting the treads of the main girders of a metallic wing for aircrafts consisting of a metal sheet having substantially a rectangular shape, a side of which is intended to be applied against the web of the girder and is rectilinear, while the opposed side is concave, the two other sides being cut away to fit the treads of the girder.

7. Aircraft fuselage frame comprising longitudinals, and vertical and diagonal side members for connecting said longitudinals together, all these elements consisting of U-shaped sectional irons having their open sides outwardly disposed with respect to the frame, lateral flanges on said irons parallel to the bottom part of the U, the flanges of adjoining irons being disposed in the same vertical plane and gussets for uniting said irons to each other.

8. A metallic aircraft wing comprising in combination a stationary covering having openings on the under side of the wing, a fixed flat metal sheet secured to said covering along one edge of each opening and protruding from said edge, a partially cut away corrugation on said sheet, a hinge member formed of a metal sheet bent into the shape of a tube provided with two outer longitudinal projections, a removable panel secured to said hinge member, a partially cut away corrugation on the tubular part of said hinge member, the corrugations on said flat sheet and of said hinge member being adapted to file into the cut away sections of each other, and a spindle adapted to be passed between said corrugations for removably connecting said metal sheet with said hinge member.

9. A metallic air-craft wing comprising in combination a stationary corrugated covering having openings on the under side of the wing, a fixed flat metal sheet secured to said covering along one edge of each opening and protruding from said edge, a partially cut away corrugation on said sheet parallel to the corrugations of the covering, a hinge member formed of a metal sheet bent into the shape of a tube provided with two outer longitudinal projections, a removable panel secured to said hinge member, a partially cut away corrugation on the tubular part of said hinge member and parallel to the corrugations of the covering, the corrugations on said flat sheet and of said hinge member being adapted to file into the cut away sections of each other and a spindle adapted to be passed between said corrugations for removably connecting said metal sheet with said hinge member.

In testimony whereof I have signed my name to this specification.

HENRY CHARLES ALEXANDRE POTEZ.